Patented Nov. 28, 1933

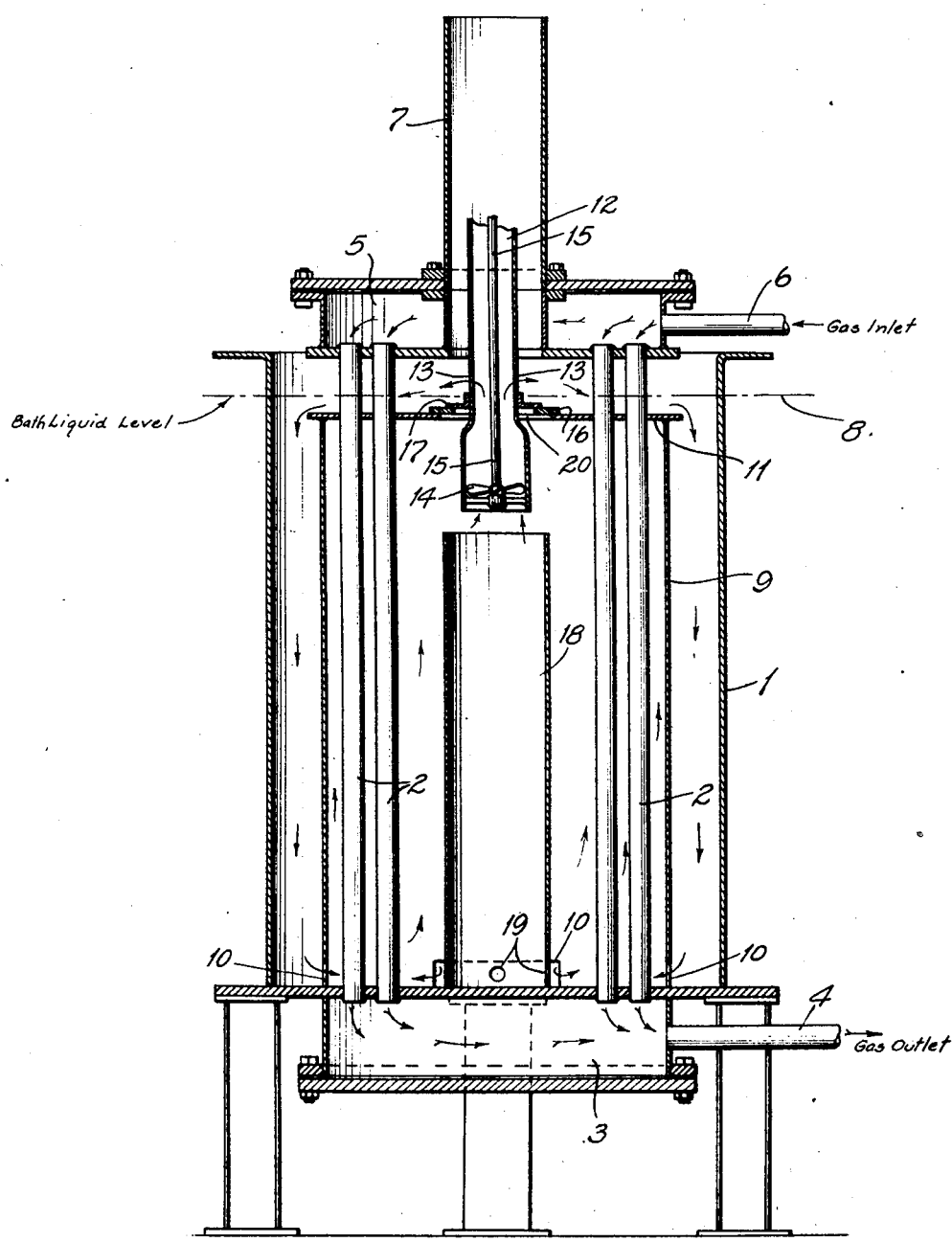

1,936,610

UNITED STATES PATENT OFFICE 1,936,610

APPARATUS FOR CONDUCTING CATALYTIC PROCESSES

Benjamin E. Thomas, Webster Groves, Mo., assignor, by mesne assignments, to Monsanto Chemical Company, a corporation of Delaware Application October 14, 1929. Serial No. 399,412

14 Claims. (Cl. 257—204)

This invention relates to an apparatus for effecting catalytic chemical reactions and it has particular application to those processes in which one must provide for the transfer of a substantial quantity of heat. Such reactions include the air oxidation of aromatic hydrocarbons as, for example, the production of phthalic anhydride from naphthalene.

Heretofore it has been suggested that exothermic reactions be conducted in an apparatus which is controlled by liquids that may be made to boil at the temperature at which the reaction is most advantageously conducted see for example U. S. Patent #1,324,443 to Conover. It has likewise been suggested that such processes be conducted in an apparatus which is cooled by a non-boiling liquid medium as in U. S. Patent #668,020 to Kneitsch.

This invention deals with an apparatus in which there is employed a non-boiling bath and has for its principal object the provision of a device by which uniform distribution and dissipation of heat may be realized.

The principles of my invention are illustrated diagrammatically in the accompanying sectional elevational view of an embodiment which may be preferred.

The structure includes an open cylindrical container 1 the base of which is provided with a plurality of holes where one end of the vertical catalyst tubes 2 are made secure. The lower extremities of the tubes discharge into a common chamber or manifold 3 from which the fluid is withdrawn through a gas exit pipe 4. The upper extremities of the tubes are fitted securely to a gas inlet chamber or manifold 5 which is essentially a fluid tight cylindrical member, provided with a gas inlet duct 6 and a coaxial opening wherein a tubular member 7 forms the inner wall. All of the joints making up this portion of the structure are sealed carefully in order to assure a gas tight union that will prevent escape of the gas that is conducted through the apparatus.

The gas mixture which is to be subjected to catalytic oxidation is introduced into the upper chamber 5 through the duct 6 from which it is distributed uniformly into the several vertical catalyst tubes 2. The tubes are packed with an appropriate catalyst (not shown) such for example as fused vanadium oxide fragments. The gas which is discharged from the tubes is received in the lower chamber 3 from which it is withdrawn through the gas exit duct 4 into a train of apparatus (not shown) adapted to recover the valuable constituents.

In the air oxidation of hydrocarbons considerable heat is generated which must be abstracted, while at the same time maintaining the temperature at a potential which best serves the desired reaction. I have been able to attain these results satisfactorily by means of a non-boiling liquid bath which surrounds the tubes within, to the level indicated by the broken line 8. Circulation of the bath around the tubes whereby a uniform temperature is maintained is attained by interposing a cylindrical partition or skirt 9 between the tubes and the walls of the container. The partition is provided at its base with apertures 10 through which fluid communication is had. A plate 11 is disposed on the upper end of the partition and preferably just below the surface of the liquid. The plate is provided with one large aperture 12 which is coaxial and coextensive with the tube 7 in the intake chamber. In addition there are provided a plurality of openings for the catalyst tubes 2, the clearance between the openings and the tubes being sufficient to afford a free sliding fit and insufficient to allow appreciable amounts of fluid to leak therethrough.

An axial discharge pump unit is suspended within the tube and immersed a short distance below the level of the fluid. It consists of a sleeve member 12 having an open end immersed in the bath and a plurality of openings 13 in the lateral portions just above the level of the fluid and also above the plate 11. A screw or blade type rotor is disposed within the sleeve and is suspended from a vertical power driven shaft 15. The fluid is sucked upwardly into the sleeve and discharged above the plate 11 through the openings 13 so positioned.

The type of pump as well as the precise manner of installation is, of course, optional. One installation which gives satisfactory results is illustrated and consists in its essentials of the sleeve having an enlarged rotor zone which is disposed in the bath fluid. The pump suspension includes a washer 16 whose inner diameter is less than that of the enlarged portion of the sleeve and whose outer diameter is sufficient to overlap the aperture in the plate on which it rests. A flanged ring 17 which is adapted to be clamped securely to the sleeve rests freely on the washer and affords a sealed fit therewith. This construction enables one to raise or lower the pump in any desired position of adjustment and, further, enables one to withdraw the pump at any time when the operation of the converter is suspended.

The upper central portion of the converter being given over to the pump no catalyst tubes can be located there. In order, however, that the fluid which is circulated by the pump be prevented from by-passing the tubes and rising upwardly to the pump through the central portion, a pipe section 18 is interposed within the central portion in order to consume the vacant space. Small holes 19 at the base of the pipe section are provided for the purpose of facilitating drainage of the converter and do not interfere with the general flow of the fluid during the operation of the converter which flow is indicated by the solid arrows.

The normal flow of the fluid in an apparatus of my design includes in its circuit the downward passage between the container wall and the partition to the aperture in the partition. After entering the communicating passage ways 10 the fluid is drawn by the pump upwardly around the tubes where it abstracts heat generated by the reaction within the tubes. After it reaches the upper extremity of the tubes it is drawn into the pump sleeve and finally discharged through the aperture 13 from which point it flows over the edge of the plate 11 and downwardly again between the wall of the container and the partition.

When the reaction is exothermic the contact with the container wall surface will dissipate excess heat from the bath liquid. In order to afford more accurate control, a jacket for controlling the air currents along the surface of the container can be added. As an alternative one may introduce a coil in heat transfer relationship with the bath through which water is circulated in order to remove excess heat. For many processes, however, normal or induced air currents will be found to give sufficient temperature regulation.

The bath fluid which is selected depends upon the character of the reaction. Where the temperature of the reaction is comparatively low mercury or oil may be employed advantageously. Where the temperature is above the normal boiling point of mercury other materials, such as—lead or fusible salt mixtures, may be employed. In the manufacture of phthalic anhydride lead gives satisfactory results. However, by reason of its reactivity with atmospheric agents, as well as its mass, I prefer to employ a fused salt mixture of potassium and sodium nitrates. At the temperature of the phthalic anhydride reaction these salts are molten, inert, possess the required heat capacity and fluidity and are otherwise suited to perform the functions of the bath.

While the apparatus is particularly adapted for exothermic reactions of the class hereinabove described, it will be apparent that it is not so limited and may be employed for endothermic reactions where a non-boiling bath is desired. In such event a plurality of burners positioned along the walls of the container may be substituted for the water coil or air cooling system.

In the claims the expression "non-volatile liquid bath" refers to the condition of the bath at approximately the operating temperature of the apparatus.

From the description and drawing hereinabove set forth it will be apparent to those skilled in the art that my invention is broadly applicable to chemical reactions wherein a thermic reaction is involved and a non-boiling fluid bath is employed. It will likewise be apparent that many modifications may be introduced without departing from the spirit of this invention wherefore I desire that it be limited only as indicated in the claims.

What I claim is:

1. An apparatus of the class described comprising a non-volatile liquid bath container, a plurality of tubes vertically disposed in said container and surrounded by liquid in the container, the ends of said tubes being projected through the base of said container, intake and exhaust manifold means secured to the ends of the tubes, a partition disposed within the bath and spaced from the wall of the container and mechanical circulating means for withdrawing fluid from within the partition and discharging it downwardly between the partition and the wall of the container.

2. An apparatus of the class described comprising a non-volatile liquid bath container, a plurality of tubes vertically disposed in said container and surrounded by bath liquid in the container, the ends of said tubes projecting through the base of said container, intake and exhaust manifold means secured to the ends of the tubes, a vertical partition encircling the major portion of the tubes provided with fluid communicating passages at the lower level of the bath fluid and a plate secured to the partition member near the surface of the liquid bath having an aperture therein through which the bath liquid may circulate from the tube zone to the space between the inner wall of the container and the partition.

3. An apparatus of the class described comprising a non-volatile liquid bath container, a plurality of tubes vertically disposed in said container and surrounded by liquid in the container, the ends of said tubes projecting through the base of said container, intake and exhaust manifold means secured to the ends of the tubes, a vertical partition encircling the major portion of the tubes provided with fluid communicating passages at the lower level of the bath fluid, a plate secured to the partition member near the surface of the liquid bath having an aperture therein through which the bath liquid may flow, and means for circulating the bath liquid through a circuit which includes the aperture in the plate and the fluid communicating passage way in the partition.

4. In an apparatus of the class described, including a non-volatile liquid bath container, bath liquid disposed therein, a plurality of vertical catalyst tubes within the container projecting through the base thereof and extending above the upper surface level of the liquid, a bath liquid circulating system, which includes a vertical partition spaced from the walls of the container and encircling the tubes, a plate supported on the partition having apertures in which the tubes are fitted and a large aperture for the passage of the bath fluid.

5. In an apparatus of the class described, including a non-volatile liquid bath container, a plurality of vertical catalyst tubes projecting through the container and surrounded by the liquid therein, a bath liquid circulating system, which includes a vertical partition spaced from the walls of the container and having a fluid communicating passage therein adjacent the lower level, a horizontal plate disposed below the level of the liquid and adjoining the partition having a large aperture and a plurality of small apertures through which the tubes pass, an axial discharge pump positioned below the plate adapted to promote circulation of the bath liquid upwardly about the tubes into the pump through the large aperture in the plate, transversely of the tubes, over the edge of the plate and downwardly between the container wall and the partition.

6. An apparatus of the class described comprising a non-volatile liquid bath container, a plurality of tubes vertically disposed in said container, intake and exhaust manifolds being secured to the ends of the tubes, a partition disposed intermediate the wall of the container and the tubes and adapted to afford bath liquid circulation from one side thereof to the other, a bath medium which is liquid yet substantially non-volatile under the normal conditions of operation of the apparatus within the container, and means including a horizontal baffle and pump mechanism adapted to promote a flow of the bath liquid upwardly about the tubes and downwardly between the wall of the container and the partition.

7. An apparatus of the class described comprising a non-volatile liquid bath container, a plurality of tubes vertically disposed in said container, intake and exhaust manifolds being secured to the ends of the tubes, a partition disposed intermediate the wall of the container and the tubes and adapted to afford bath liquid circulation from one side thereof to the other, a bath medium which is liquid yet substantially non-volatile under the normal conditions of operation of the apparatus within the container, a horizontal baffle cooperatively disposed with respect to the partition, having an aperture therein, and a pump mechanism adjacent said aperture adapted to promote the flow of bath liquid about the tubes and between the wall of the container and the outer surface of the partition.

8. An apparatus of the class described comprising a non-volatile liquid bath container, a plurality of tubes vertically disposed in said container, intake and exhaust manifolds being secured to the ends of the tubes, a partition disposed intermediate the wall of the container and the tubes and adapted to afford bath liquid circulation from one side thereof to the other, a bath medium which is liquid yet substantially non-volatile under the normal conditions of operation of the apparatus disposed within the container, the upper level thereof being below the upper extremity of the tubes and means including a horizontal baffle disposed adjacent the partition within the container said means being adapted to direct a circulation of the bath liquid from the tube zone embraced by the partition and baffle, downwardly between the wall of the container and the outer surface of the partition, and back to the tube zone.

9. An apparatus of the class described comprising a non-volatile liquid bath container, a plurality of tubes vertically disposed in said container, intake and exhaust manifolds being secured to the ends of the tubes, a partition disposed intermediate the wall of the container and the tubes and adapted to afford bath liquid communication from one side thereof to the other, a bath medium which is liquid yet substantially non-volatile under the normal conditions of operation disposed within the container, the upper level thereof being below the upper extremity of the tubes, a horizontal baffle disposed within the container having an aperture therein and a pump mechanism disposed adjacent the said aperture adapted to promote circulation of bath liquid from the tube zone embraced by the partition and baffle to the space between the bath container and the partition, and back again to the tube zone.

10. An apparatus of the class described comprising a non-volatile liquid bath container, a plurality of vertical tubes disposed in said container, intake and exhaust manifold means secured to the ends of the tubes, a partition adapted to provide liquid communication therethrough near the upper and lower levels thereof disposed within the container and spaced with respect to the container wall, a horizontal baffle plate positioned within the bath adjacent one extremity of the partition cooperatively disposed with respect to said partition and adapted to afford liquid communication therethrough and to direct a flow of the bath medium substantially transversely of the tubes.

11. An apparatus as defined in claim 10 and further characterized in that the partition encircles the major portion of the tubes.

12. An apparatus as defined in claim 10 and further characterized in that the partition encircles the major portion of the tubes and the baffle is disposed near the upper level of the bath.

13. An apparatus as defined in claim 6 and further characterized in that the horizontal baffle and partition are so disposed as to afford substantially unrestricted flow of the bath medium longitudinally of the tubes.

14. An apparatus of the class described comprising a non-volatile liquid bath container, a plurality of vertical tubes disposed in said container and surrounded by bath liquid in the container, the ends of said tubes being projected through the base of said container, intake and exhaust manifold means secured to the ends of the tubes, a partition disposed within the bath embracing the tubes and spaced from the wall of the container adapted to afford bath liquid communication from one side thereof to the other and means for propelling and directing bath fluid from within the zone embraced by the partition transversely of the tubes into the zone between the partition and the wall of the container.

BENJAMIN E. THOMAS.